United States Patent [19]
Wallace

[11] 3,982,421
[45] Sept. 28, 1976

[54] SEAL TESTER
[76] Inventor: Richard G. Wallace, R.D. No. 1-Box 16T, Blairstown, N.J. 07825
[22] Filed: Nov. 6, 1975
[21] Appl. No.: 629,512

[52] U.S. Cl. .................................. 73/40; 73/46
[51] Int. Cl.² .................................. G01M 3/26
[58] Field of Search .................. 73/40, 46, 49.8; 340/242

[56] References Cited
UNITED STATES PATENTS

| | | | |
|---|---|---|---|
| 1,371,484 | 3/1921 | Howard | 73/40 |
| 1,414,075 | 4/1922 | Dodds | 73/40 |
| 3,043,129 | 7/1962 | King | 73/40 |
| 3,793,876 | 2/1974 | Oswald | 73/46 |
| 3,882,715 | 5/1975 | Slinger | 73/46 |

Primary Examiner—Richard C. Queisser
Assistant Examiner—Joseph W. Roskos
Attorney, Agent, or Firm—Dennison, Dennison, Meserole & Pollack

[57] ABSTRACT

A pneumatic cylinder having a manually retractible piston therein operative to draw a vacuum upon the sealing of a readily compressible sealing head about an area to be tested for leakage. A spring loaded lever selectively engages between the piston manipulating handle and the cylinder end upon a retraction of the piston to provide a generally uniform application of vacuum pressure and maintain the applied pressure which is in turn registered on an attached vacuum gauge communicating with the cylinder near the seal.

11 Claims, 4 Drawing Figures

SEAL TESTER

The invention herein is generally concerned with apparatus for the testing of seals about screws, rivets and like fasteners. More particularly, the present invention proposes a testing device for sealing about the fastener and subjecting the fastener to a gauge measured vacuum for the detection of leakage through the mounted fastener.

While not necessarily limited thereto, the device herein is specifically intended as a means for the rapid and efficient testing of the seals formed about screws and/or rivets utilized to fasten metal roof panels on preengineered metal buildings. In connection therewith, the tester need only be positioned with the readily compressible seal over the exposed head of the fastener and a handle manually retracted so as to draw the vacuum. Upon the retraction of the handle a predetermined distance, a spring loaded lever snaps into position so as to lock the handle in its retracted position and set the apparatus with an approximate predetermined negative pressure about the fastener. This negative pressure is registered on an appropriate vacuum gauge attached to the tester, which gauge provides an immediate indication of any leakage. Release of the vacuum is easily effected by a manipulation of the locking lever so as to release the handle for a forward movement thereof.

The actual sealing of the apparatus about the fastener is effected by means of a relatively deep cup of readily compressible material capable of complete conformance to any minor surface irregularities about the fastener whereby any leakage detected by the apparatus will be only that which is being effected through the fastener assembly itself. The relatively deep construction of the seal or sealing head is also of particular significance in providing for the accommodation of raised head fasteners without affecting the operation of the tester which allows for a creation of the desired negative pressure without a manipulation of the sealing head beyond an initial positioning thereof in close conformance with the surface about the fastener.

The apparatus basically consists of an elongated hollow cylinder having the sealing head mounted at one end thereof with a continuous internal chamber being provided through the sealing head and full length of the cylinder. A piston is slidably mounted within the cylinder and manipulated through a rearwardly located rod mounted handle. The handle in turn mounts a spring loaded locking lever which, upon a retraction of the handle and piston a predetermined distance, locks into position behind the cylinder end. The pressure thus created is registered on a cylinder mounted gauge adjacent the sealing head.

The particular objects and advantages achieved by the implement which constitutes the invention include a high degree of portability and manual maneuverability whereby a user can quickly move across a fastener secured surface, testing each of the fasteners for leakage. The highly compressible seal or sealing head, in conjunction with the seal adaptor and hollow cylinder end coaxial therewith, enables the accommodation of a wide range of fasteners regardless of the head projection thereon. The automatically engageable locking lever automatically insures the drawing of an approximate predetermined vacuum and a locking of the device in the vacuum drawn position without further or continued application of force on the part of the user.

The known prior art does not include either the specific structural components which contribute to the uniqueness of the present apparatus, or the specific advantages derived therefrom. The known prior art is exemplified by the following patents:

| HOBBS   | 3,524,342 |
| STERNS  | 2,748,598 |
| ANDRUS  | 2,679,747 |
| ENELL   | 2,847,851 |
| HARRY   | 3,115,031 |
| PIPES   | 3,138,949 |
| DODDS   | 1,414,075 |
| HOWARD  | 1,371,484 |

The above objects and advantages, together with others which will become apparent from the following description, reside in the details of construction and operation as more fully hereinafter described and claimed, reference being had to the accompanying drawings forming a part hereof wherein like numerals refer to like parts throughout and in which:

Figure 4:
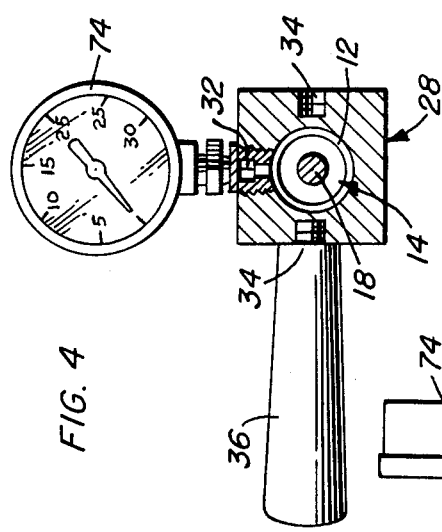
FIG. 4 is a transverse cross-sectional view taken substantially on a plane passing along line 4—4 in FIG. 2.

Referring now more specifically to the drawings, the seal testing device in its entirety is designated by reference numeral 10. The tester 10 basically includes an elongated cylinder 12 and a vacuum generating piston 14 slidably received therein and provided with appropriate o-rings or the like 16 so as to maintain a constant sealed engagement with the inner chamber wall of the cylinder 12.

The piston 14 has an elongated rod 18 engaged therewith and projecting rearwardly therefrom through cylinder 12, terminating in locked engagement with an enlarged handle 20 forming so as to provide an inner enlarged cylindrical portion 22 and an outer generally conical gripping portion 24, the taper of which provides a finger accommodating groove 26.

The rear end of the cylinder 12 is enclosed by a block-like cap 28 threaded on the rear end of the cylinder 12 and including a central aperture 30 therethrough for slidable reception of the piston rod 18. The end cap 28 also includes a bushing defined vent hole 32 opening through the flat upper surface thereof and communicating the interior of the cylinder 12 with the atmosphere. Finally, a pair of opposed internally threaded blind bores 34 are provided in the opposite flat sides of the cap 28 for the reception of a laterally projecting auxiliary handle 36 which facilitates the manipulation of the device 10, particularly during the initial drawing of the vacuum as shall be explained subsequently.

The cylinder enlarged forward portion 22 of the handle 20 includes a front to rear groove or channel 38 therethrough. An elongated locking lever 40 overlies the groove 38 and includes a depending integral enlargement 42 received within the groove 38 and secured, by a transverse pin 44, for pivotal rocking as suggested by the full line and phantom line showings in FIG. 3. Rearward rocking is facilitated by the arcuate configuration 46 of the rear of the projection with the forward pivotal movement of the locking lever being limited by engagement of the flat forward surface 48 of the projection 42 with the bottom of the groove or channel 38.

Figure 1:
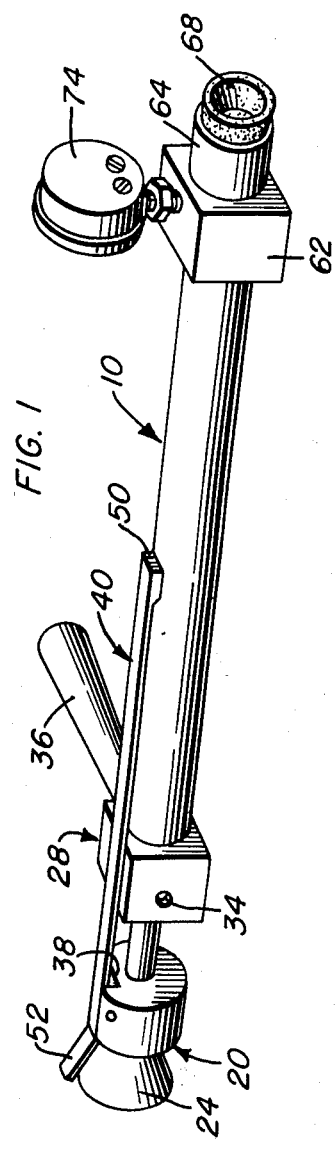
FIG. 1 is a perspective view of the seal testing implement in its relaxed position.
Figure 2:
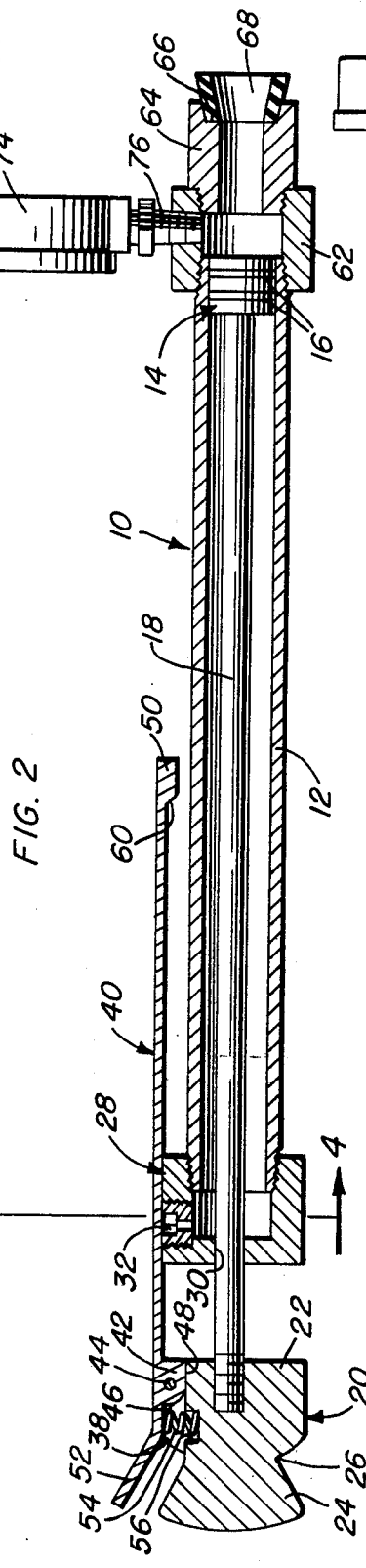
FIG. 2 is an enlarged longitudinal cross-sectional view through the implement as shown in FIG. 1.
Figure 3:
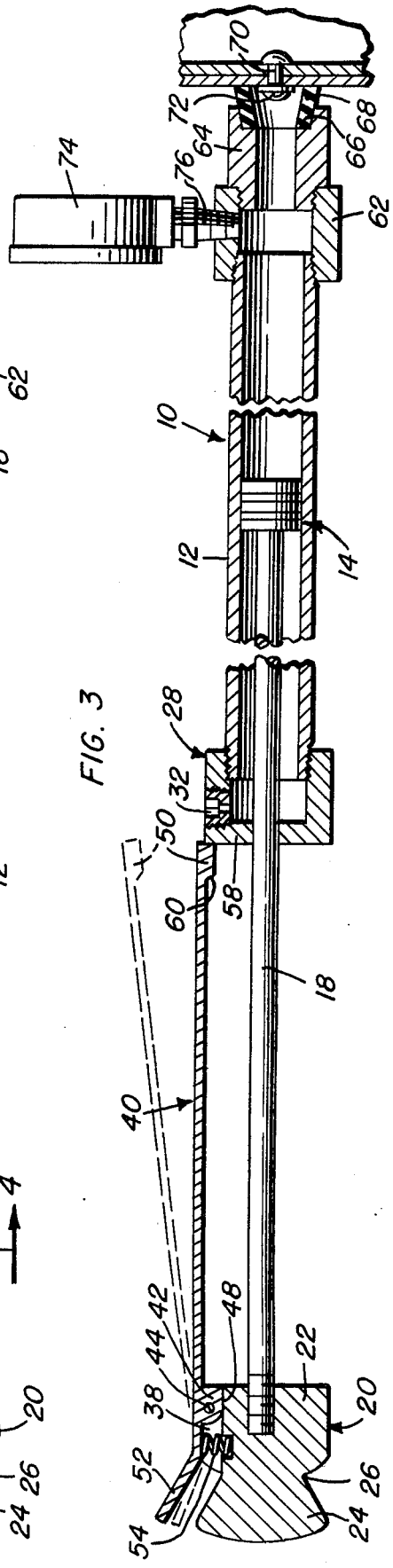
FIG. 3 is a longitudinal cross-sectional view through the implement in its extended vacuum drawing position orientated in operative engagement with a fastener secured surface about the fastener itself.

The locking lever 40 projects a substantial distance forward of the pivotal mounting thereof to the handle 20 so as to, in the relaxed position of the device as illustrated in FIGS. 1 and 2, overlie the cylinder cap 28 and a portion of the cylinder 12, terminating in an integral depending enlarged abutment end 50. Rearward of the pivotal mounting, the locking lever 40 initially projects colinear with the forward portion of the lever 40 and then angles upwardly as at 52 so as to provide a convenient finger portion for manipulation of the lever 40 against the biasing force of an expanded coiled compression spring 54 engaged between the lever 40, immediately forward of the portion 52, and a spring accommodating socket 56 defined at the rear of the groove 38 in the handle 20. This spring 56 exerts a constant downward biasing force on the forward abutment defining end 50 of the lever 40 so as to, in the relaxed position of the device illustrated in FIG. 2, maintain the lever 40 compactly against the cap 28 and cylinder 12 in a stored position, and, in the extended or active position as illustrated in FIG. 3, in engagement with the rear face 58 of the cap 28 so as to in effect lock an approximate predetermined negative pressure within the device. It is contemplated that the rear face or edge 60 of the projection 50 be inclined forwardly and downwardly so as to provide in effect a camming surface which freely rides over the cap 28 as the handle 20 is drawn rearwardly without requiring a separate manipulation of the lever 40. Once the large abutment end 50 passes beyond the rear face 58 of the cap 28, the spring 54 will automatically swing the lever downward so as to position the abutment end 50 behind the cap 28 whereby the handle 20, and hence the piston rod 18 and the piston 14, will be locked in the rearwardly retracted position until a manual release of the lever 40. As previously indicated, the downward swinging of the lever 40 can be limited by the engagement of the flat forward surface 48 of the mounting enlargement 42 with the flat bottom surface of the groove or channel 38.

Referring now to the forward end of the cylinder 12, a hollow block-like cap 62, internally threaded at the opposite ends thereof, mounts on the externally threaded end of the cylinder 12 and in turn mounts a forwardly projecting seal adapter 64, also hollow or provided with an internal passage therethrough, forming in effect a continuation of the cylinder chamber.

The forward end of the adaptor 64 is provided with a slightly flared counter-sunk portion 66 which defines a recessed or shoulder area for the reception of the inner end of the seal or sealing head 68. This sealing head 68, as will be appreciated, is annular and of a generally conical or tapering configuration. The sealing head 68 will preferably be adhesively secured within the counter-sunk forward portion of the adaptor 64 using an appropriate adhesive material such as Goodyear "Pliobond" or the like. It is particularly significant that the sealing head 68 be capable of accommodating relatively rough surfaces and sealing thereto in a positive air excluding manner. Accordingly, the sealing head will preferably, although not necessarily exclusively, be formed of a butadiene acrylonitrile copolymer elastomer with a durometer hardness of approximately 16 to 20. Also, in order to adapt the instrument 10 to accommodate fasteners, herein generally designated by reference numeral 70, incorporating enlarged projecting heads 72, the seal or sealing head 68 is specifically provided with a substantial length or depth, generally slightly greater than ½ inch, in addition to the aforementioned flaring configuration. By the same token, inasmuch as the adapter 64, cylinder head 62 and cylinder 12 itself form in effect a hollow continuation of the sealing head 68, the device will also easily accommodate fasteners with projecting ends, heads or the like, which extend beyond what would normally be anticipated as suggested in FIG. 3.

In order to provide a visual indication of the actual negative pressure generated by the device 10 and any leakage being encountered about the fastener 70 being tested, an appropriate conventional vacuum gauge 74 is mounted on the blocklike head 62 by means of an appropriate adapter 76 threaded therebetween and providing a communicating passage from the hollow interior of the head 62 to the gauge 74.

In use, the collapsed device will be positioned with the sealing head 68 in engagement with the surface about the fastener 70 to be tested. A downward force will be exerted on the device, preferably through the auxiliary handle 36, so as to closely form the readily compressible sealing head 68 with the surface. Next, the piston 14 will be retracted by a rearward pulling on the handle 70 until such time as the locking lever abutment 50 rides over the cylinder cap 28 and drops there behind. At which point, the handle 20 will be released and the abutment 50 automatically engaged against the rear surface 58 of the cap 28, thereby locking an approximate predetermined negative pressure as registered on the gauge 74, within the device 10. The user of the device then need only be concerned with a simple retention of the device in position for such time as he deem it necessary to determine whether any leakage about the fastener exists. The device is then easily released by an upward swinging of the locking lever 40 by a finger engaged with the handle portion 52 thereof. As will be appreciated, utilized in the above manner, the testing of a large number of fasteners can be effected both rapidly and efficiently.

The foregoing is considered illustrative only of the principles of the invention. Numerous modifications and changes may occur to those skilled in the art, and as much, it is not desired to limit the invention to the exact construction and operation shown and described. Accordingly, all suitable modifications and equivalents may be resorted to, falling within the scope of the invention as claimed.

What is claimed as new is:

1. A seal tester for screws, rivets, and like fasteners, said tester comprising an elongated hollow cylinder having first and second ends, an annular sealing head mounted on the first end of the cylinder and directly communicating with the interior thereof, said sealing head projecting forwardly of said first end for reception about and enclosure of the projecting end of a secured fastener, said sealing head being formed of a readily compressible resilient air impermeable material for conformance to and air excluding engagement with a surface about and through which the fastener is secured, manual means operable through the second end of the cylinder and movable to a position developing a negative pressure therein upon an air excluding engagement of said head, and a negative pressure measuring gauge mounted in communication with the interior of the cylinder.

2. The tester of claim 1 including lock means automatically engageable upon the development of an approximate predetermined pressure within said cylinder by said manual means for maintaining the pressure developing position of the manual means and the approximate predetermined pressure.

3. The tester of claim 2 wherein said manual means includes a piston slidably mounted within said cylinder in sealed relation thereto, an elongated piston rod affixed to said piston and extending through the second end of said cylinder, and an enlarged hand gripping handle mounted on the outer end of said piston rod for enabling a manual manipulation of said rod and piston in a manner whereby an outward drawing of the piston toward the second end of the cylinder will effect the development of a negative pressure within said cylinder at and inward of the first end thereof upon an appropriate air excluding engagement of the sealing head.

4. The tester of claim 3 wherein said lock means includes an elongated fixed to said handle and projecting therefrom toward and generally parallel to said cylinder, said lever, at the end thereof remote from said handle, defining an abutment selectively engageable with the second end of said cylinder upon a retraction of said handle outward away from the second end of the cylinder for precluding inward movement of said handle toward the second end of said cylinder and a fixing of the position of the handle, and hence the piston, relative to said cylinder, the abutment end of said lever being selectively disengageable from the second end of the cylinder to allow an inward movement of the handle and associated piston, and a corresponding movement of the lever into overlying relation with the cylinder inward of the second end thereof.

5. The tester of claim 4 wherein said sealing head has a durometer hardness of approximately 16 to 20.

6. The tester of claim 5 wherein said sealing head is mounted on the first end of the cylinder by means including a hollow adapter, said adapter having a counter sunk recess on one end for reception of a portion of the sealing head therein, said sealing head flaring outward from a relatively smaller inner end adhesively secured within the counter sunk recess, said sealing head, adapter and cylinder being coaxially aligned.

7. The tester of claim 4 including means pivotally mounting said locking lever to said handle for selective movement between a first position orientated so as to engage the abutment end of the lever with the second end of the cylinder and a second position upwardly swung therefrom so as to clear the abutment from the second end of the cylinder and allow an inward movement of the handle, and resilient means biasing said lever into said first position.

8. The tester of claim 7 including a handle portion on said lever projecting beyond the handle mounted portion thereof for manual manipulation of said lever against the biasing means.

9. The tester of claim 1 wherein said sealing head has a durometer hardness of approximately 16 to 20.

10. A seal tester for screws, rivets and like fasteners, said tester comprising an elongated hollow cylinder having first and second ends, an annular sealing head mounted on the first end of the cylinder and directly communicating with the interior thereof, a piston slidable within said cylinder in a manner whereby retraction thereof develops a negative pressure within said cylinder, an elongated piston rod affixed to said piston and projecting through the second end of said cylinder handle means mounted on the outer end of said rod for a manipulation of the rod and piston, lock means associated with the piston, piston rod and handle means assembly for selective engagement between this assembly and the cylinder for locking the assembly in its retracted negative pressure developing position, and a negative pressure measuring gauge mounted in communication with the interior of the cylinder.

11. The tester of claim 10 wherein said lock means includes an elongated lever fixed to said handle means and projecting therefrom toward and generally parallel to said cylinder, said lever, at the end thereof remote from said handle means, defining an abutment selectively engageable with the second end of said cylinder upon a retraction of said handle means outward away from the second end of the cylinder for precluding inward movement of said handle means toward the second end of said cylinder and a fixing of the position of the handle means, and hence the piston, relative to said cylinder, the abutment end of said lever being selectively disengageable from the second end of the cylinder to allow an inward movement of the handle means for selective movement between a first position orientated so as to engage the abutment end of the lever with the second end of the cylinder and a second position upwardly swung therefrom so as to clear the abutment from the second end of the cylinder and allow an inward movement of the handle, and resilient means biasing said lever into said first position.

* * * * *

UNITED STATES PATENT OFFICE
CERTIFICATE OF CORRECTION

PATENT NO. : 3,982,421
DATED : September 28, 1976
INVENTOR(S) : RICHARD G. WALLACE It is certified that error appears in the above-identified patent and that said Letters Patent are hereby corrected as shown below:

Column 2, line 47, change "forming" to -- formed --;

Column 4, line 52, change "much" to -- such --;

Column 5, line 26, after "elongated" insert -- lever --.

Signed and Sealed this

Fourteenth Day of December 1976

[SEAL]

Attest:

RUTH C. MASON
Attesting Officer

C. MARSHALL DANN
Commissioner of Patents and Trademarks